July 21, 1936.    R. S. SANFORD    2,048,472
BRAKE
Filed April 23, 1931    2 Sheets-Sheet 2
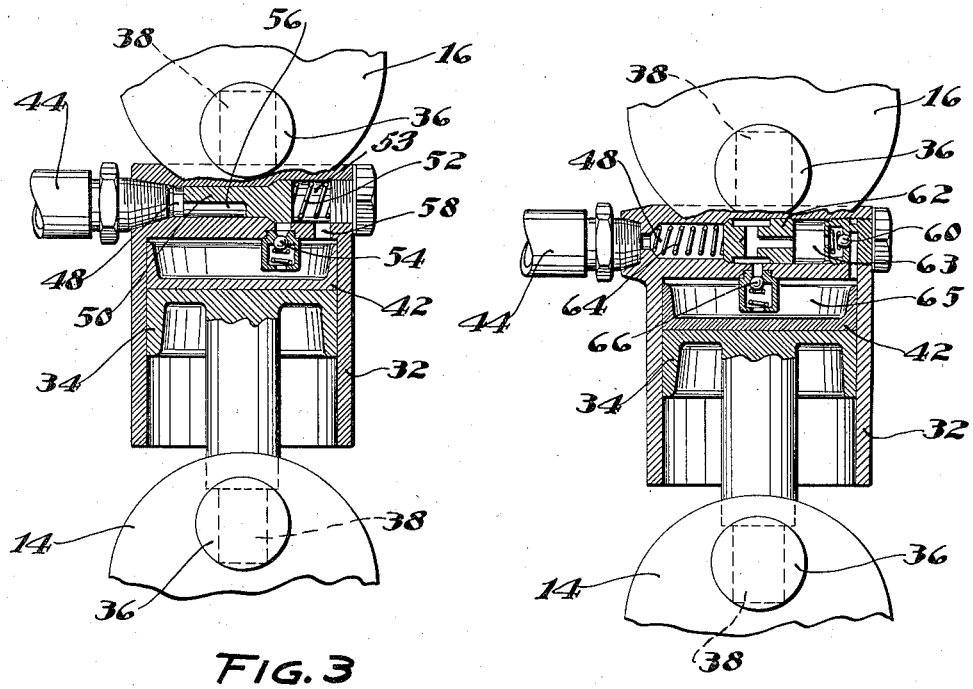
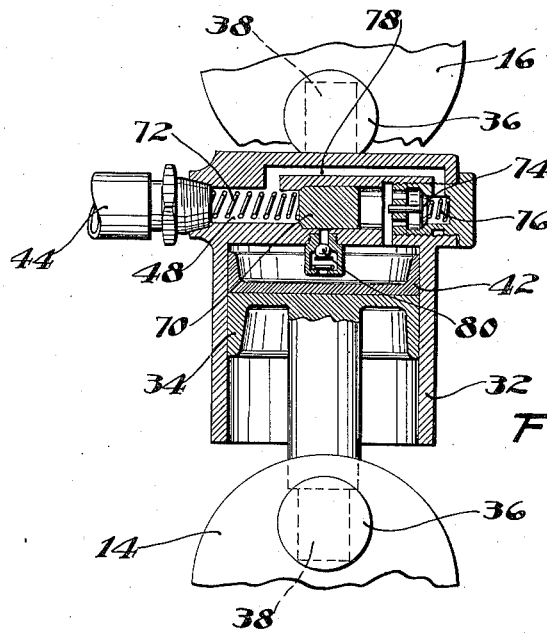
INVENTOR.
ROY S. SANFORD
BY
ATTORNEY.

Patented July 21, 1936

2,048,472

UNITED STATES PATENT OFFICE 2,048,472

BRAKE

Roy S. Sanford, South Bend, Ind., assignor to Bendix Brake Company, South Bend, Ind., a corporation of Illinois Application April 23, 1931, Serial No. 532,263

14 Claims. (Cl. 188—152)

This invention relates to brakes, and is illustrated as embodied in a hydraulically-actuated internal expanding automobile brake of the type having a shiftable anchorage which is effective according to the direction of drum rotation.

One feature of the invention relates to a novel arrangement of applying means for a brake, preferably of the described type, such that the shoes are first forced apart by a floating articulating means serving as a connection between them, and which is illustrated as a novel secondary fluid-pressure actuator, and then are forced apart at the ends adjacent the anchorage by a primary actuator also shown as operated by fluid pressure.

This primary actuator in itself embodies novel structures and arrangements and I prefer also to utilize it as the brake anchorage, the shoes for example engaging pistons shouldered to engage opposite ends of a cylinder fixedly secured to the backing plate or its equivalent.

An important feature of the invention has to do with arranging one of the actuators, preferably the one serving as an articulation between the shoes, to adjust the brake for wear. I prefer to do this in a manner making the adjustment automatic, for example by permitting the injection therein of an indeterminate amount of fluid while applying the brake, and trapping this fluid by novel means such as a simple but effective valve mechanism illustrated in several forms in such a manner that only a predetermined quantity of the fluid is forced back out before the release of the brake. A number of important minor features relate to the design and arrangement of the automatic valve mechanism.

Various other features of the invention, including novel constructions and arrangements of parts, will be apparent from the following description of the illustrative embodiments shown in the accompanying drawings, in which:

Figure 1 is a vertical section through the brake, just inside the head of the brake drum, and showing the brake shoes in side elevation;

Figure 2 is a partial section through the primary actuator, which also serves as a brake anchorage, in a plane paralleling Figure 1; and Figures 3, 4, and 5 are similar sections through different forms of secondary actuators each arranged to serve as an articulating joint and automatic adjustment connecting the shoes.

The illustrated brake includes a rotatable drum 10, at the open side of which is a support such as a backing plate 12, and within which is arranged the friction means of the brake. The friction means is shown as including a pair of shoes 14 and 16, provided with suitable spring steady rests or the like 18 and connected by an articulating joint consisting of a floating secondary fluid-pressure actuator hereinafter fully described.

Between the anchored ends of the shoes is arranged a primary fluid pressure actuator, illustrated as also serving to form the brake anchorage, and preferably including a cylinder 20 fixedly secured to the backing plate. Within the cylinder are arranged two pistons 22 and 24, provided with packings 26 of rubber or the like, having rounded ends engaging the ends of the shoes 14 and 16, and formed with shoulders 28 anchoring against the opposite ends of the cylinder 20. The pistons act, in applying the brake, against a relatively heavy return spring 30 tensioned between the shoes.

When the drum is turning counter-clockwise (car moving forward), shoe 16 anchors through piston 22 against the cylinder 20; when the drum is turning clockwise (car moving backward), shoe 14 anchors through piston 24 against the cylinder 20.

The secondary fluid-pressure actuator includes a cylinder 32 and piston 34 extending respectively into recesses in the ends of the shoes and engaging the flattened sides of pivots 36 carried by the shoe ends. The cylinder and the thrust rod part of the piston may be provided with small-diameter pilot portions 38 seated in corresponding openings in the pivots 36. A secondary return spring 40, lighter than spring 30, is tensioned between the articulated ends of the shoes. Piston 34 may have a suitable rubber packing 42. Since the pistons of the primary actuator and those of the secondary actuator are of the same diameter, this difference in the strength of springs 40 and 30 insures that the secondary actuator will operate first.

Cylinders 20 and 32 are arranged respectively at the front and rear of the brake, where there is more room than at the top or bottom, and their intakes are connected by conduits 44 to a T-fitting 46 at the top of the brake. Fitting 46 is arranged opposite the top of the king pin, where it has a minimum of movement during steering, and is connected by the usual flexible conduit (not shown) to the hydraulic lines on the chassis frame.

Between the intake of cylinder 32, opening into a passage 48, and the operating chamber within the cylinder above the piston, there is arranged a novel automatic valve mechanism which in its construction and arrangement comprises an imhad worn a corresponding amount. Of course when the drum cools off, the brake will be over-adjusted and will drag.

With the above-described arrangement, it is now merely necessary again to apply the brakes momentarily, whereupon each brake will again automatically adjust itself with respect to the cool drum, thereby correcting the over-adjustment.

While several illustrative embodiments have been described in detail, it is not my intention to limit the scope of the invention to those particular embodiments, or otherwise than by the terms of the appended claims.

July 21, 1936.   P. Q. R. SCHREIBER   2,048,473
TOBACCO CUTTING MACHINE
Filed April 11, 1935    4 Sheets-Sheet 1
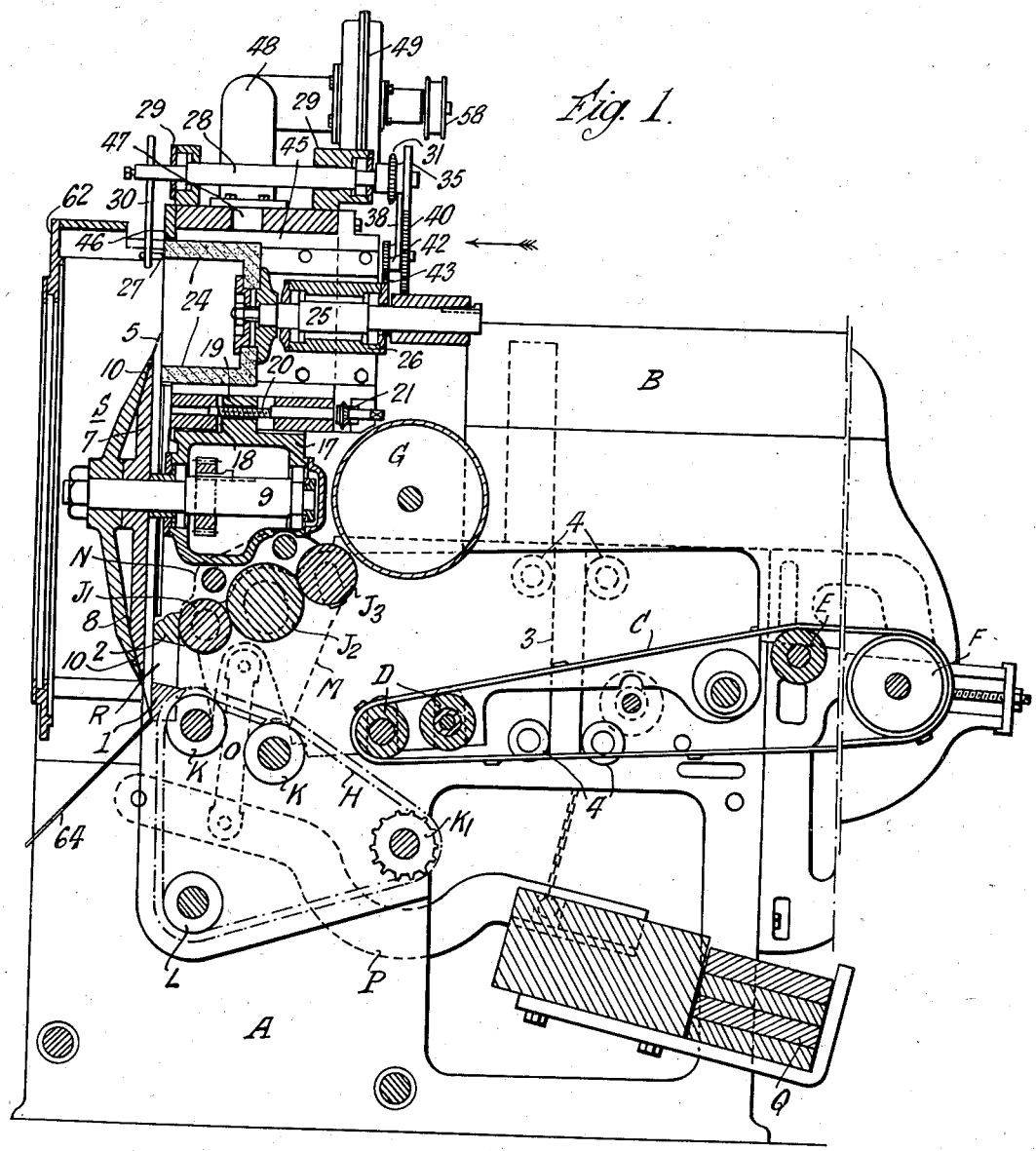

I claim:

1. A fluid-pressure wheel cylinder having an intake connection and an intake passage communicating therewith, and an operating chamber initially separated from said passage by a movable measuring device and in communication with said passage at the end of the stroke of said device.

2. A fluid-pressure operator having an intake connection and an intake passage communicating therewith, and an operating chamber initially separated from said passage by a movable measuring device and in one-way communication with said passage at the end of the stroke of said device, the fluid introduced into said chamber from said passage being trapped therein ahead of the measuring device.

3. In a fluid brake system, a friction element, fluid pressure lines associated therewith, a device for moving said friction element to take up clearance, means for trapping fluid in said device, and additional means for forcing said friction element into braking contact.

4. A brake comprising a drum, friction means associated with said drum, an applying means located in said drum, and fluid pressure means also located in said drum for adjusting the friction means to compensate for wear.

5. A brake comprising friction means having separable ends, an applying means therefor, and fluid pressure means positioned between said separable ends for adjusting the friction means to compensate for wear.

6. In a brake system using fluid, a brake, a wheel cylinder, a master cylinder, a piston in said master cylinder for developing pressure in the fluid in said wheel cylinder to apply said brake, connections between said cylinders, means comprising a stationary one-way valve for trapping a portion of said brake applying fluid, and means including said master piston and connections for adding pressure in applying said brake after said trapping action.

7. A brake comprising a drum, a pair of friction members adapted to anchor on one member in one direction of rotation and on the other member in the opposite direction of rotation of the drum, a pair of fluid pressure devices each acting on both of said members, together with means for insuring successive actuation for said devices.

8. A brake comprising a drum, a pair of friction members positioned in said drum and both arranged to anchor during one direction of drum rotation upon an end of one friction member and in the other direction of drum rotation upon an end of the other member, a pair of applying devices which act on said members respectively at their opposite ends and one of which is connected between the ends of the friction members to form a floating articulating joint therefor, and means for insuring successive actuation of said devices.

9. A brake comprising a drum, a pair of friction members positioned within said drum arranged to anchor on an end of one of said members during one direction of drum rotation and upon an end of the other member during the opposite direction of drum rotation, a pair of separate fluid pressure applying devices acting on said members respectively at their opposite ends, and means for insuring successive actuation of said devices.

10. A brake comprising a brake drum, a pair of shoes having a fluid pressure actuator arranged to take the braking torque of said shoes, and fluid pressure means positioned within said drum and separately connected to said friction means for adjusting said brake to compensate for wear.

11. A brake comprising a brake drum, friction means within said drum, an applying device within said drum, and fluid pressure means separately connected to said friction means for adjusting the friction means to compensate for wear also positioned in said drum.

12. A brake comprising a brake drum, friction means within said drum, an applying device within said drum, and an automatically actuated fluid pressure means separately connected to said friction means for adjusting the friction means to compensate for wear also positioned within said drum.

13. In a hydraulic brake system, a brake drum, a friction member in said drum, a hydraulic pressure actuator for said friction member positioned in said drum, hydraulic pressure lines for supplying liquid to said actuator, and hydraulic means positioned within said drum for adjusting said friction member for wear, said adjusting means comprising a separate device in addition to said actuator and in addition to said liquid supplying lines separately connected to said friction means.

14. A brake comprising a brake drum, a pair of shoes, a fluid pressure actuator arranged to apply said shoes, and a fluid pressure automatic wear adjustment arranged within the drum in combination with means for automatically correcting for over adjustment.

ROY S. SANFORD.